Jan. 30, 1945. W. H. SILVER 2,368,266
POWER LIFT
Filed April 8, 1943 2 Sheets-Sheet 2
FIG. 2
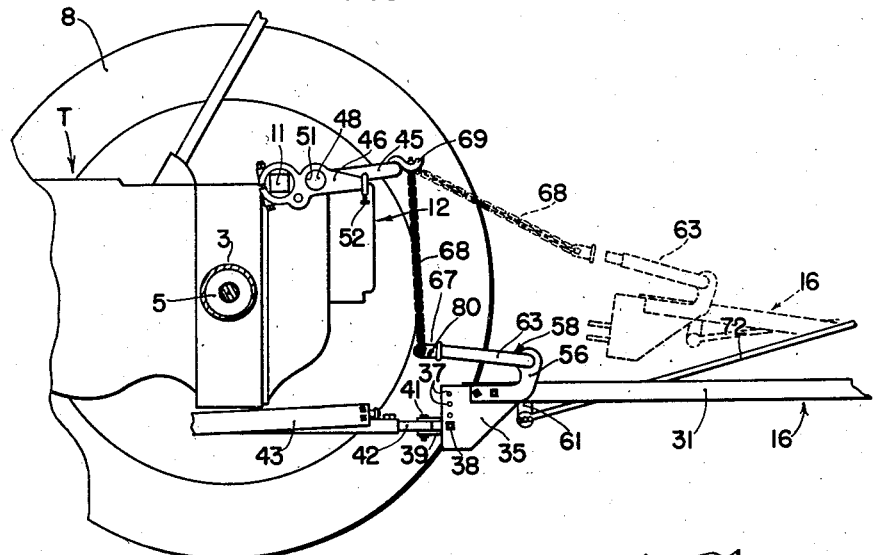
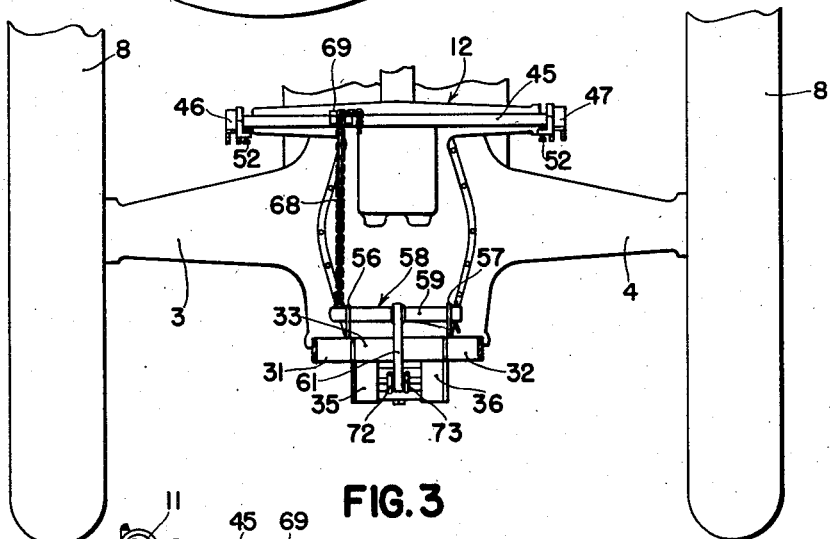
FIG. 3
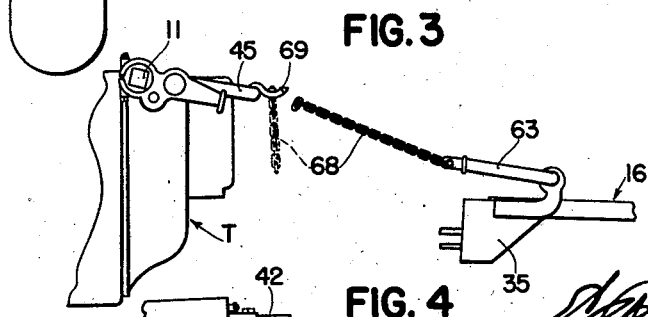
FIG. 4
INVENTOR.
WALTER H. SILVER
ATTORNEYS Patented Jan. 30, 1945

2,368,266

UNITED STATES PATENT OFFICE 2,368,266

POWER LIFT

Walter H. Silver, Moline, Ill., assignor to Deere & Company, Moline, Ill., a corporation of Illinois Application April 8, 1943, Serial No. 482,349

15 Claims. (Cl. 97—50)

The present invention relates generally to agricultural implements and more particularly to implements adapted to be connected in trailing relation to the rear of a propelling tractor.

The object and general nature of this invention is the provision of a new and improved connection between the tractor power lift and the implement part or parts to be raised and lowered. More specifically, it is a feature of the present invention to provide a rockable lever on the hitch frame or forward portion of the implement and having a forwardly extending arm disposed adjacent or substantially in line with the vertical axis about which the implement swings generally laterally relative to the tractor, with a power actuated member disposed above said lever and operatively connected therewith through a generally vertically extending torsionally flexible link which, by virtue of being disposed closely adjacent or in said axis, accommodates any lateral swinging of the implement relative to the tractor without affecting the position or adjustment of the implement by virtue of its connection with the tractor power lift.

Another feature of this invention is the provision of a detachable sleeve forming a part of the connection between the implement lever and the power lift arm, said detachable sleeve being held on said lever by a break pin or the equivalent so that upon the occurrence of abnormal load conditions or other means causing the connecting pivot to break, the break pin of the connections just described also breaks so that there will be no danger of the tractor tipping over. A further feature of this invention is the provision of a connection between the torsionally flexible link means and the power lift arm, so arranged, especially when the implement is in operating position, that the upper end of the link means slips off of the power lift arm in the event that the hitch connection with the tractor fails.

These and other objects and advantages will be apparent to those skilled in the art after a consideration of the following detailed description.

In the drawings:

Figure 2 is a side view, showing particularly the vertical connection between the implement adjusting lever on the implement and the power lift arm on the rockshaft;

Figure 3 is a rear view; and

Figure 4 is a view showing the manner in which the normally upwardly extending link means is disconnected from the power lift in the event the hitch pin should break.

Figure 1:
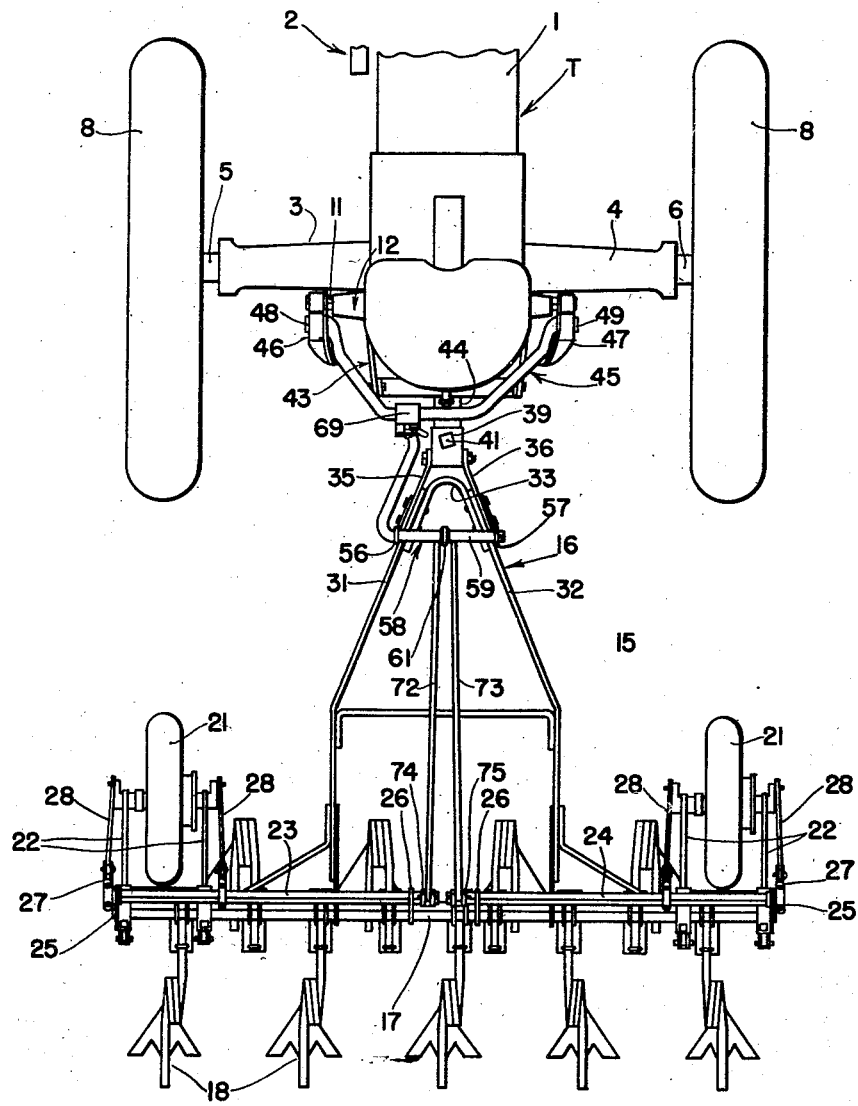
Figure 1 is a plan view of a tractor and trailing implement in which the principles of the present invention have been incorporated.

Referring now more particularly to Figure 1, the tractor, which is indicated in its entirety by the reference letter T, is of conventional construction, embodying a frame 1 supporting a power plant 2 and having rear axle extensions 3 and 4 in which axle shafts 5 and 6 are disposed. Traction wheels 8 are fixed to the laterally outer ends of the axle shafts 5 and 6. The tractor T is of the type having a power lift rockshaft 11 that is actuated hydraulically from the tractor power plant 2 and is adapted to be rocked through approximately 60 degrees and held in different positions by suitable control means (not shown). For example, the power lift mechanism, which is indicated in its entirety by the reference numeral 12, may be like that disclosed and claimed in the United States application, Serial No. 453,907, filed August 6, 1942, by Wayne H. Worthington, to which reference may be had if necessary.

The trailing or towed implement chosen to illustrate the principles of the present invention, is indicated in its entirety by the reference numeral 15 and may take the form, as shown, of a tool bar cultivator having a forward hitch frame 16, a rear tool supporting frame 17 and tools 18 connected thereto in any suitable manner. The implement 15 is supported on a pair of ground wheels 21 connected for rocking movement by pivoted arms 22 connected at their rear ends to brackets fixed to the laterally outer ends of the tool frame or tool bar 17. The latter is adapted to be raised and lowered relative to the supporting wheels 21 by means of a pair of rockshafts 23 and 24 supported upon suitable brackets 25 and 26 on the tool bar 17 and having arms 27 fixed to the rockshafts and connected by links 28 to raise and lower the frame relative to the wheels by rocking the rockshafts 23 and 24. The hitch frame 16 includes a pair of rearwardly divergent bars 31 and 32 connected together at their forward ends by a curved plate 33 (Figure 1). Also secured to the forward ends of the bars 31 and 32 is a pair of generally triangularly shaped hitch brackets 35 and 36. The brackets 35 and 36 are apertured, as at 37 (Figure 2), to receive a pivot bolt 38 by which a hitch clevis 39 may be connected thereto at different points, depending upon the tractor to which the implement 15 is connected. The clevis 39 is connected by a vertical pivot bolt 41 with the drawbar 42 of the tractor, the latter being supported in a drawbar frame 43 in the usual way.

The lifting mechanism, operatively disposed between the power lift rockshaft 11 on the tractor and the implement rockshafts 23 and 24 on the implement 15, and with which the present invention is more particularly concerned, will now be described. A bail 45 is connected with a pair of arms 46 and 47 that are secured to opposite ends of the power lift rockshaft 11, the ends 48 and 49 of the bail being disposed in openings formed in the arms 46 and 47, as best shown in Figure 2, whereby the bail 45 may have movement relative to the power lift arms 46 and 47. The position of the bail relative to the arms may be adjusted by a set screw 52 which is carried at the rear end of each of the arms 46 and 47 and contacts the bail, as shown in Figure 2. A pair of brackets 56 and 57 are fixed to the forward ends of the hitch frame members 31 and 32 and rockably receive a bell crank member indicated in its entirety by the reference numeral 58. The member 58 includes a central shaft section 59 journaled for rocking movement in the brackets 56 and 57 and is provided with a depending arm 61 disposed downwardly between the forward ends of the hitch frame bars 31 and 32 and a forwardly extending generally horizontal arm 63, the forward end of which is disposed substantially in line with or closely adjacent the pivot axis defined by the pivot bolt 41, this being the pivot axis about which the implement 15 may shift laterally relative to the tractor T. A releasable sleeve member 67 is disposed over the forward end of the arm 63 and receives the lower end of a chain 68, the upper end of which is connected to a clip 69 secured, as by welding or the like, to the central portion of the bail 45, also substantially in line with or closely adjacent the vertical axis defined by the bolt 41. The downwardly extending arm 61 of the bell crank 59 is connected by a pair of links 72 and 73 with arms 74 and 75 fixed respectively to the laterally inner ends of the implement rockshafts 23 and 24.

The operation of the present invention is substantially as follows.

When the power lift rockshaft 11 is in its normally lowered position, tightening or loosening the set screws 52 positions the bail 45 and, acting through the chain 68, the bell crank 58, and the rockshafts 23 and 24, serves to adjust the implement 15 for the desired maximum depth of operation. By suitably actuating the tractor power lift, the rockshaft 11 may be raised a certain amount, and this raising action pulls upwardly on the chain 68 and, swinging the bell crank 58 in a clockwise direction (Figure 2), exerts a pull through the tension links 72 and 73 to raise the tool frame 17 a slight amount. The implement 15 may also be raised into its fully raised or transport position by causing the power lift shaft 11 to be rocked to its fully raised position. The disposition of the vertical chain 68 close to or substantially in line with the pivot axis defined by the bolt 41 provides a construction which, due to the torsional flexibility of the element 68, permits the implement 15 to take different lateral positions relative to the tractor without affecting the desired control of the position of the tool frame 17 by the position of the tractor power lift rockshaft 11.

As shown in Figure 4, when the power lift bail 45 is in a lowered or operating position, the end portion of the hook or clip 69 is disposed almost in a horizontal position. This does not effect the connection of the chain 68 therewith as long as the chain is vertical, but if it should occur that the hitch pin 41 should break, the implement will fall back and, the chain 68 taking a nearly horizontal position, the front end thereof will readily slip out of the hook or clip 69. The clip 69 has a slot in which any one of the upper links of the chain 68 may be engaged, thus providing an adjustable connection at this point.

When the power lift bail is in an upper transport position or an upper or shallow operating position, as shown in Figure 2, the rear end of the clip 69 may be disposed at an upper angle so that the upper end of the chain may not readily slip out of the slot. To take care of the possible breakage of the hitch under these conditions the following means is provided.

The releasable sleeve 67 is normally held in position on the forward end of the bell crank arm 63 by means of a light cotter pin 80, the cotter pin 80 being of the type that may be sheared readily. The purpose of this arrangement is as follows. In the event that the hitch bolt 41 should break, as by the implement 15 encountering an abnormal resistance, the continued forward travel of the tractor T would then exert a substantially forward pull through the link 68 against the forward end of the implement, as shown in dotted lines in Figure 2. Since the implement would, under this condition, be connected with the tractor at a point well above the axle 3, there would be a considerable force tending to overturn the tractor. In order that this may be prevented, the light cotter key 80 is employed. When the parts approach the dotted line position (Figure 2), the cotter pin 80 will shear long before there is any considerable pull developed against the tractor. When the cotter pin 80 shears, the sleeve 67 slips forwardly off of the front end of the arm 63, thereby completely releasing the implement from the tractor. When hitching the implement to the tractor under normal conditions, it is a relatively simple matter to install the sleeve 67 and insert the cotter key 80. It will be seen from Figure 2 that normally the cotter key 80 does not sustain any of the forces involved in lifting or adjusting the implement, since the pull of the chain 68 is substantially at right angles to the arm 63.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an implement adapted to be pivotally connected with a tractor having a power lift, said implement having a hitch frame and a part to be raised, raising mechanism comprising a bell crank pivotally mounted on the forward part of said hitch frame and having a depending arm and a generally forwardly extending arm, tension means movable in a generally fore and aft direction and connecting the depending arm with the implement part to be raised, said forwardly extending arm being formed so that the forward end thereof is disposed substantially in line with the axis of pivotal connection between the tractor and said hitch frame, and means accommodating lateral swinging of the implement about said axis for connecting said forward end of the bell crank with said tractor power lift.

2. In an implement adapted to be pivotally connected to a tractor having a transverse power lift rockshaft and including a part to be raised and forward hitch means, including rearwardly divergent members, a pair of brackets fixed, respectively, to the forward portions of said members in laterally spaced relation, a crank rockably supported by said brackets and including an arm extending generally downwardly between said members and a generally forwardly extending arm, generally longitudinal link means connecting the lower end of said depending arm with said implement part, an arm on said rockshaft, and generally upwardly extending link means connecting the forward end of said forwardly extending arm and the arm on said rockshaft.

3. In combination, a tractor having a power lift member, a trailing implement, hitch means pivotally connecting the implement with the tractor, a rockable member pivotally mounted on the implement and including a section movable upwardly generally in line with the axis of pivotal connection of the implement with the tractor, a connection extending generally upwardly from the end of said section to said power lift member whereby operation of said power lift member rocks said pivoted member, and means releasably connecting said upwardly extending connection with one of said members whereby said hitch means fails or is released said upwardly extending connection is released from said one member.

4. In combination, a tractor having a power lift member, a trailing implement, means pivotally connecting the implement with the tractor, a rockable member pivotally mounted on the implement and including a section movable upwardly generally in line with the axis of pivotal connection of the implement with the tractor, said power lift member being disposed generally vertically above said rockable member, and a torsionally flexible connection extending generally upwardly from the end of said section to said power lift member whereby operation of said power lift member rocks said pivoted member, said flexible connection including means releasably connected with said tractor power lift member.

5. In combination, a tractor having a power life member, a trailing implement, means pivotally connecting the implement with the tractor, a rockable member pivotally mounted on the implement and including a section movable upwardly generally in line with the axis of pivotal connection of the implement with the tractor, a generally vertically extending connection connected at its upper end with said power lift member, a releasable part on the forward end of said section, the lower end of said connection being connected to said releasable part, and means serving as a break pin holding said releasable part on said section.

6. In a towed implement adapted to be connected to a tractor having a source of power, power actuated adjusting mechanism comprising a lever on the implement, a power actuated arm on the tractor, a generally vertically arranged member connecting said lever with said arm, and means responsive to a change in the angular position of said member relative to the implement and tractor for disconnecting said member therefrom.

7. In a towed implement adapted to be connected to a tractor having power lift mechanism including a generally upwardly movable part, said implement having a part to be adjusted, means connected with the forward portion of the implement and arranged to control the position of said implement part, said last mentioned means including a generally upwardly extending section, a connection between said upwardly extending section and the upwardly movable part of said power lift means, said latter part having a hook-like element which is angled so that, when said connection is in a position extending substantially downwardly therefrom, movement of said power lift part acts through said connection to shift said implement part, said element being angled to such a degree that, when the hitch connection between the implement and the tractor is interrupted the upper end of said normally downwardly extending connection slips rearwardly away from said element, thereby interrupting the connection between the power lift means and the implement.

8. In a towed implement adapted to be connected to a tractor having a source of power, power actuated adjusting mechanism comprising a lever on the implement, a power actuated arm on the tractor, a generally vertically arranged member connecting said lever with said arm, and means providing for disconnection of said member from said arm in response to a generally rearwardly directed pull exerted against said member.

9. In a towed implement adapted to be connected to a tractor having a source of power, power actuated adjusting mechanism comprising a lever on the implement, a power actuated arm on the tractor, a generally vertically arranged torsionally flexible member, and means releasable by a generally rearwardly directed pull connecting said arm and lever, respectively, with the upper and lower ends of said flexible member.

10. In combination, a tractor having a power lift member, a trailing implement having a part to be adjusted, means releasably connecting the implement with the tractor, a member mounted on the implement and including a section movable upwardly generally in line with the axis of pivotal connection of the implement with the tractor and operatively connected with said implement part to be adjusted, tension means connected at its upper end with said power lift member and normally disposed generally vertically so long as the implement remains connected with the tractor, and means responsive to a change in the direction of pull of said connecting means, as in a direction that would tend to tip the tractor if the implement should become unhitched from the tractor, for disconnecting said connecting means.

11. In a towed implement adapted to be connected to a tractor having a source of power, power actuated adjusting mechanism on the implement, a power actuated arm on the tractor, a generally vertically arranged member adapted to act in tension, and in a generally vertical direction so long as the implement is connected with the tractor, between said arm and said mechanism, and means responsive to a change in the angular position of said member relative to the implement and tractor for disconnecting said member therefrom.

12. The combination with a tractor having a power lift part, of an implement hitched to the tractor below said power lift part and having a part to be adjusted, a tension connection extending between said parts and generally downwardly from said power lift arm, and means responsive to a change in the direction of pull of said tension connection on said parts, as in a direction that would tend to tip the tractor if the implement should become unhitched from the tractor, for disconnecting said tension connection.

13. In a towed implement adapted to be connected to a tractor for lateral movement relative thereto about a generally vertical axis and including frame means and a hitch section rigid therewith, implement adjusting means comprising a lever pivotally mounted on the forward part of said hitch section and having a forwardly extending arm disposed closely adjacent said generally vertical axis, an actuating arm on the tractor having an end disposed closely adjacent said axis, and a link connection disposed substantially vertically and connected at one end with said arm and at the other end with said lever.

14. In a tractor propelled implement adapted to be connected to a tractor having a power lift arm and a hitch-receiving connection below said arm, said implement having a part to be adjusted, a tension member connected with said part and extending upwardly toward and connected with said arm, and means for disconnecting said tension member from said arm when said tension member extends generally rearwardly relative to said arm.

15. In a tractor, a power lift arm, and an implement controlling connection adapted to engage said arm and to extend generally downwardly therefrom, said arm being so angled that, when said connection is in a position extending substantially downwardly therefrom, movement of said power lift arm acts through said connection to control said implement and, when the hitch connection between the implement and the tractor is interrupted, the upper end of said normally downwardly extending connection slips rearwardly away from said arm.

WALTER H. SILVER.